Patented Mar. 24, 1936

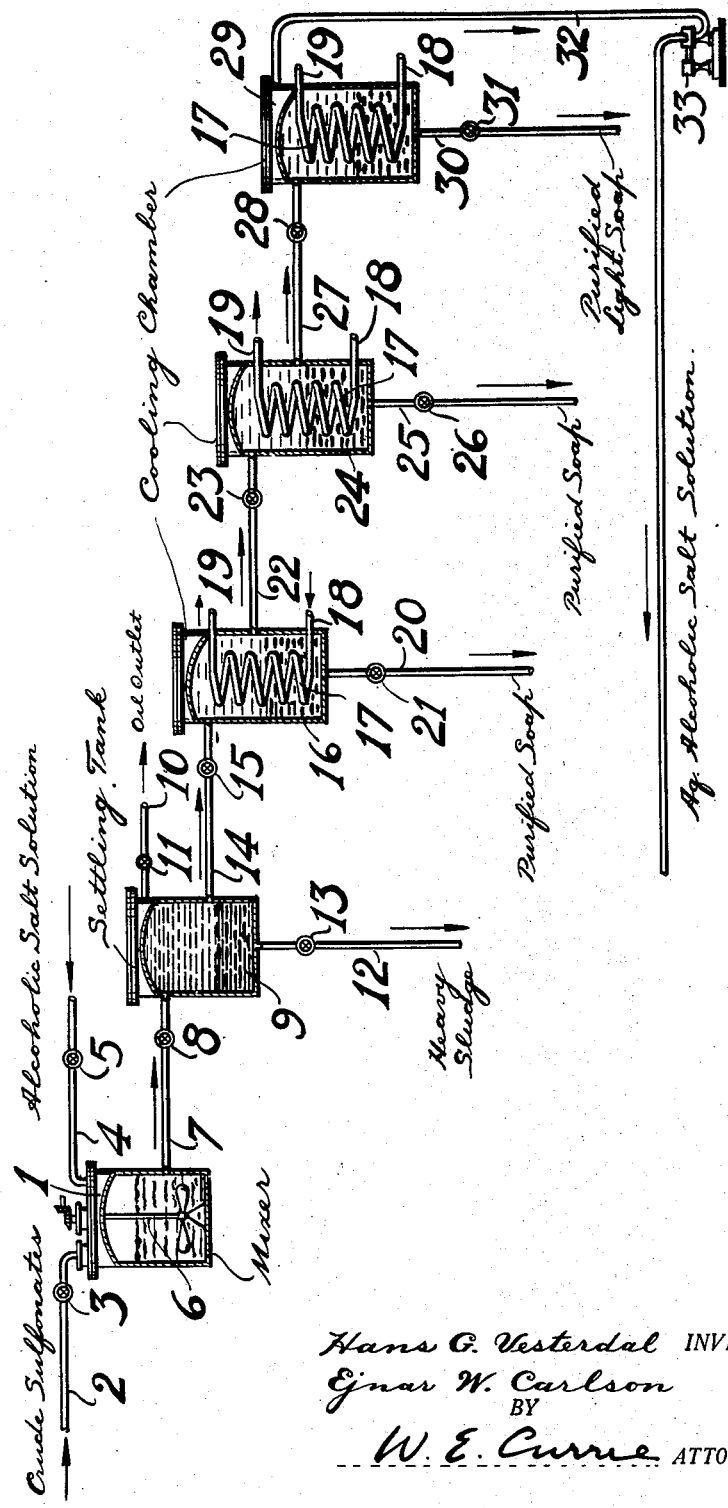

2,035,106

UNITED STATES PATENT OFFICE 2,035,106

PURIFICATION AND SEPARATION OF SULPHONATES

Hans G. Vesterdal and Ejnar W. Carlson, Elizabeth, N. J., assignors to Standard Oil Development Company, a corporation of Delaware Application May 23, 1932, Serial No. 612,982

13 Claims. (Cl. 260—159)

This invention relates to a process of purifying sulphonated components of oil and particularly to a process of fractionally extracting said sulphonated components in a pure condition.

The oils embraced within the scope of this invention are hydrocarbon oils characterized by the presence of certain components susceptible to modification by the action of sulphuric acid and certain components not susceptible. Oils such as petroleum, shale oil, coal tar oil, and other oils derived by distillation from carbonaceous deposits, and various fractions of such oils, usually exemplify this characteristic, as is well understood in the oil industry.

When petroleum or fractions thereof, such as lubricating stock, is treated with sulphuric acid, certain components of the oil are modified. The theory chemically accepted at present is that these components react with the sulphuric acid to form mineral oil sulphonic acids, together with other compounds.

This mixture may be treated with basic metallic substances or compounds such as sodium hydroxide, sodium carbonate, or ammonia, to produce various salts, such as sulphonates and sulphates mixed with water and oil.

Therefore, one object of this invention is to provide a process to remove the impurities and to recover substantially pure sulphonates.

When oils are treated with sulphuric acid, generally sulphonic acids of higher and lower combining weights are formed.

Therefore, another object of this invention is to provide a method of fractionally separating the sodium sulphonates as to their combining weights.

Other objects and advantages will appear in the following illustration of our process, in which The figure is a flow sheet illustrating one embodiment of the invention.

Referring to the drawing, numeral 1 indicates a mixing chamber into which a solution of crude sulphonates (e. g. sodium sulphonates) is passed through pipe 2 arranged with valve 3. The solution of crude sodium sulphonates is recovered from petroleum sludge, particularly such sludges as are produced by treating heavy hydrocarbon oils with strong or fuming sulphuric acid. The sludge acids are separated from the oil that has been treated, washed with water to remove the excess sulphuric acid, and neutralized with an alkali such as sodium hydroxide or ammonia to form the crude sulphonates.

A solution comprising a water-soluble organic solvent, water and salt, containing up to 15 percent of water-soluble organic solvent, such as alcohol or acetone, and up to 10 percent of a salt (sodium chloride or sodium sulphate) is passed through pipe 4 fitted with valve 5 into the mixing chamber 1. The proportions of crude sulphonates and aqueous organic salt solution passed into the mixing chamber 1 are about 1 to 5 when the solution of crude sulphonates contains about 50 percent of sulphonates and lower proportions of about 1 to 3 are used when the solution of crude sulphonate contains about 30 percent of sulphonates. The water-soluble organic solvent will hereafter be called alcohol as any one of the various alcohols may be used such as methyl, ethyl, isopropyl, etc., though other water soluble organic solvents, such as acetone, may be used.

The solution of crude sulphonates and aqueous alcoholic salt solution are thoroughly mixed by stirrer 6 in mixing chamber 1 at room temperature. The resulting mixture is allowed to flow by gravity through pipe 7 arranged with valve 8 into settling tank 9. The mixture in settling tank 9 separates into 3 layers; a bottom layer of heavy sludge, a middle layer of an aqueous alcoholic salt solution of sodium sulphonates and a top layer of oil. The oil is removed through pipe 10 arranged with valve 11 and the bottom layer of heavy sludge is removed through pipe 12 arranged with valve 13. The middle layer of aqueous alcoholic salt solution of the sulphonates flows by gravity through pipe 14 arranged with valve 15 into the first cooling chamber 16. This cooling chamber 16 and the successive cooling chambers are cooled by circulating a cooling solution, such as brine, through the coils 17 by means of the inlets 18 and outlets 19. The temperatures of the cooling chambers are regulated by thermostatic means (not shown) to maintain the desired temperatures in the various cooling chambers.

In the first cooling chamber 16 the aqueous alcoholic salt solution containing the sulphonates is cooled to about +5° C. and separates into two layers. The bottom layer comprises precipitated sulphonates substantially free of inorganic salts together with occluded material from the upper layer. The upper layer is composed of the aqueous alcoholic salt solution and the remaining fractions of the sulphonates. The fraction of sulphonates separated in the lower layer in the first cooling chamber is composed of the sulphonates having combining weight in the order of 500 and generally is about 10 to 20% of the total sulphonates. The percentage of sulphonates recovered in these cooling chambers is dependent on the composition of the crude sulphonates in the initial solution. As the composition of the solution of sulphonates varies, so will the percentages recovered in the cooling chambers.

The lower layer is withdrawn from cooling chamber 16 through pipe 20 fitted with valve 21. The upper layer of aqueous alcoholic salt solution in cooling chamber 16 is passed by gravity through pipe 22 arranged with valve 23 to cooling chamber 24. This is maintained at a temperature of about 0° C. and the solution separates into two layers. The bottom layer comprises precipitated sulphonates having a combining weight between 300 and 500, and generally contains between 40 and 50 percent of the total sulphonates. The upper layer is composed of aqueous alcoholic salt solution containing the sulphonates of a combining weight of 200 to 300. The bottom sulphonate layer is withdrawn through pipe 25 arranged with valve 26.

The upper aqueous alcoholic salt solution containing the remaining sulphonates is passed by gravity flow through pipe 27 arranged with valve 28 to cooling chamber 29. This is maintained at a temperature of about −5° C. and the solution on cooling separates into two layers. The bottom layer comprises precipitated sulphonates having a combining weight of 200 to 300 and is withdrawn through pipe 30 arranged with valve 31. The upper layer of aqueous alcoholic salt solution is withdrawn through pipe 32 by means of pump 33 and may be returned to mixing chamber 1.

The aqueous alcoholic salt solution recovered from cooling chamber 29 generally contains more salt in the form of sodium sulphate than the initial aqueous alcoholic salt solution that has been passed into mixing chamber 1 and is diluted with aqueous alcoholic solution to maintain the desired salt concentration, or the alcohol is recovered by distillation and a new solution prepared with water and the recovered alcohol and salt.

The number of fractions into which the sulphonates may be divided is not limited to three. A greater or lesser number of divisions can be made by varying the amount of salt in solution in the aqueous alcoholic solution and by using a different number of cooling chambers. A 5 to 10 percent salt solution is found to be efficient where the fractionation of the sulphonates as described is desirable. If a separation into two fractions alone is desired, a stronger aqueous alcoholic salt solution is used, that is, one containing about 10 to 20 percent of sodium chloride or sodium sulphate. With this solution the sulphonates of combining weight higher than 400 are precipitated in the first cooling chamber and the remaining sulphonates of lower combining weight are precipitated in the second cooling chamber. This process may be either continuous or batch.

The fractionation of the sulphonates is desirable in that the lower combining weight sulphonates are suitable for the preparation of various soaps, wetting agents, lubricants for tire molds and also in preparing spray solutions. A spray solution that may be used in coating solid fuels, such as coal, is of the following composition:

|  | Percent |
| --- | --- |
| Sulphonate salt | 5–15 |
| Molasses | 15–5 |
| Alcohol | 5–10 |
| Sodium chloride | 3–10 |
| Water | 72–50 |

This solution is stable in that no precipitates are formed. In spray solutions prepared with the higher combining weight sulphonates, a precipitate generally forms on standing especially if allowed to cool.

The higher combining weight sulphonates are suitable for use as carriers in paints, in the manufacture of solid soaps and in spray solutions used in coating solids such as coal, coke, etc. where either a viscous menstruum such as molasses or glycerin, etc., or a plasticizing agent such as gelatine is used.

As an incident to this process, impurities associated with the sulphonates are removed while the sulphonates are being separated in accordance with their combining weights. Ordinarily the impurities will not be sufficient to prevent recirculation of the salt-organic solvent a reasonable number of times.

Although the invention has been described particularly with reference to the treatment of sodium sulphonates from petroleum oil, it will be understood that sulphonates derived from the other oils mentioned, may be similarly treated. The sludge sulphonates are miscible with water and so amenable to this process; for example, the sulphonic compounds of ammonia, potassium, calcium, and the other alkaline earth metals, as well as many of the heavy metals.

The purified sulphonates may likewise be incorporated in spraying compositions in combination with other compounds which tend to lower the freezing point, such as sodium chloride, glycerin, alcohol, etc.

The foregoing description is merely illustrative and various alternative arrangements may be made within the scope of the appended claims in which it is our intention to claim all novelty as broadly as the prior art permits.

We claim:

1. A process of purifying a mixture of sulphonates which are preferentially soluble in an aqueous solution of sulphuric acid in the presence of a hydrocarbon oil, comprising dissolving such sulphonates in an aqueous solution of water-soluble organic solvent and salt, separating oil and a heavy sludge fraction, lowering the temperature and successively separating, as the temperature is lowered, sulphonate fractions of various combining weight.

2. The process of purifying and fractionating sulphonates formed by treating petroleum oil distillates with sulphuric acid, separating the acid sludges, washing the acid sludges with water to remove the excess sulphuric acid, and neutralizing the remaining sulphonic acids with an alkali to form the sulphonates, which comprises dissolving the sulphonates in an aqueous solution of water soluble organic solvent and salt, removing the oil and a sludge fraction, lowering the temperature in successive steps and successively removing the separated layers of sulphonates that are precipitated out at the different temperatures.

3. The process of purifying and fractionating sulphonates according to claim 2 in which the water-soluble organic solvent is an alcohol.

4. The process of purifying and fractionating sulphonates according to claim 2 in which the water-soluble organic solvent is acetone.

5. The process of purifying and fractionating acid sludge sulphonates, which comprises dissolving the sulphonates in an aqueous alcoholic solution of salt, composed of alcohol up to 15 percent and of salt up to 10 percent, removing the separated oil and sludge, lowering the temperature of the aqueous alcoholic salt solution of sulphonates to 5° C. and separating the layers formed, one of aqueous alcoholic salt solution of sulphonates and the other of substantially pure precipitated sulphonates having a combining weight of about 500 or higher, lowering the temperature of the separated aqueous alcoholic salt solution of sulphonates to 0° C., separating the layers formed, one of aqueous alcoholic salt solution of sulphonates and the other of substantially pure precipitated sulphonates having a combining weight of 300 to 500, and lowering the temperature of the separated aqueous alcoholic salt solution of sulphonates to −5° C., and separating the layers formed, one of aqueous alcoholic salt solution and the other of aqueous alcoholic solution of sulphonates having a combining weight lower than 300.

6. The process of purifying and fractionating acid sludge sulphonates, which comprises dissolving the sulphonates in an aqueous alcoholic solution of sodium sulphate, composed of alcohol up to 15 percent and of sodium sulphate up to 15 percent, removing the separated oil and sludge, lowering the temperature of the aqueous alcoholic sodium sulphate solution to about 5° C., and separating the layers formed, one of the aqueous alcoholic sodium sulphate solution of the sulphonates and the other of substantially pure precipitated sulphonates having a combining weight higher than 400, lowering the temperature of the separated aqueous alcoholic sodium sulphate solution of sulphonates to −5° C., and separating the layers formed, one of aqueous alcoholic sodium sulphate solution and the other of substantially pure precipitated sulphonates having a combining weight less than 400.

7. The process of purifying a mixture of acid sludge sulphonates, which comprises dissolving said sulphonates in an aqueous solution of organic solvent and salt, separating mineral oil and a sludge fraction and cooling to separate at least one fraction of sulphonates having a narrower combining weight range than the original mixed sulphonates.

8. As a new composition, a purified, solvent extracted, precipitated water-soluble sulphonate product derived from petroleum hydrocarbons and having a combining weight range narrower than that of the crude sulphonates originally derived from said petroleum hydrocarbons and serving as the stock for the preparation of said purified product.

9. Composition according to claim 8 in which the combining weight range is within the approximate limits of 200–500.

10. Composition according to claim 8 in which the combining weight range is within the approximate limits of 200–300.

11. The process of separating a mixture of acid sludge sulphonates derived from the sulphuric acid treating of reactive hydrocarbon oils, which comprises dissolving said sulphonates in an aqueous solvent containing a water soluble organic solvent and a water soluble inorganic salt, which does not give rise to the formation of insoluble compounds with the sulphonates, separating oil and sludge, cooling the solution to separate at least one fraction of sulphonates having a narrower combining weight range with the original mixed sulphonates.

12. Process according to claim 11, in which the said aqueous solvent contains up to about 20% of salt and up to about 15% of water soluble organic solvent.

13. Process according to claim 11, in which the said solution is cooled to progressively lower temperatures in successive steps and successively removing the separated layers of solvents formed at each cooling step.

HANS G. VESTERDAL.
EJNAR W. CARLSON.